(12) United States Patent
Yokota et al.

(10) Patent No.: US 6,696,527 B1
(45) Date of Patent: Feb. 24, 2004

(54) OLEFIN COPOLYMERS AND FILMS AND SHEETS

(75) Inventors: Kiyohiko Yokota, Ichihara (JP); Noriyuki Tani, Ichihara (JP); Nobuhide Ishihara, Ichihara (JP); Junichi Matsumoto, Ichihara (JP)

(73) Assignee: Idemitsu Petrochemical Co. Ltd., Tokyo (JP)

( * ) Notice: Subject to any disclaimer, the term of this patent is extended or adjusted under 35 U.S.C. 154(b) by 9 days.

(21) Appl. No.: 09/857,191

(22) PCT Filed: Oct. 24, 2000

(86) PCT No.: PCT/JP00/07412

§ 371 (c)(1),
(2), (4) Date: Jun. 20, 2001

(87) PCT Pub. No.: WO01/30870

PCT Pub. Date: May 3, 2001

(30) Foreign Application Priority Data

Oct. 25, 1999 (JP) ............................................. 11-301828

(51) Int. Cl.$^7$ ........................ C08L 45/00; C08F 212/06
(52) U.S. Cl. ...................... 525/210; 525/211; 525/216; 525/97; 524/553; 524/554; 526/160; 526/170; 526/347
(58) Field of Search ................................ 525/210, 211, 525/216, 97; 524/553, 554; 526/160, 170, 347

(56) References Cited

U.S. PATENT DOCUMENTS

| 4,614,778 A | 9/1986 | Kajiura et al. |
| 5,854,165 A | 12/1998 | Yabunouchi et al. |
| 5,872,201 A | 2/1999 | Cheung et al. |
| 5,874,512 A * | 2/1999 | Farley et al. ................ 526/308 |
| 6,107,232 A | 8/2000 | Yokota |
| 6,171,994 B1 | 1/2001 | Yabunouchi et al. |
| 6,339,135 B1 | 1/2002 | Kashiwamura et al. |

FOREIGN PATENT DOCUMENTS

| EP | 0 416 815 | 3/1991 |
| EP | 8 72 506 | 10/1998 |
| JP | 2000-230024 | 8/2000 |
| WO | WO 97/20872 | 6/1997 |

OTHER PUBLICATIONS

F. G. Sernetz, et al., Journal of Polymer Science: Part A: Polymer Chemistry, vol. 35, No. 13, pp. 2549–2560, "Metallocene–Catalyzed Ethene/Styrene Co– and Terpolymerization with Olefinic Termonomers", 1997.

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

Provided is a novel olefin copolymer comprising [A] a cyclic olefin, [B] an aromatic vinyl compound and [C] an aliphatic α-olefin having from 2 to 20 carbon atoms. (1) the component [A] therein accounts for from 0.1 to 30 mol %, the component [B] for from 0.1 to 49.9 mol %, and the total of the components [A] and [B] for from 0.2 to 50 mol %; and (2) the copolymer has a glass transition temperature Tg of lower than 60° C. Having a suitable modulus of elasticity, the copolymer can be a substitute for soft polyvinyl chloride as a soft resin, and it has good elastic recovery and transparency.

10 Claims, No Drawings

OLEFIN COPOLYMERS AND FILMS AND SHEETS

TECHNICAL FIELD

The present invention relates to an olefin copolymer and to films and sheets formed of the olefin copolymer. Precisely, it relates to an olefin ter-copolymer which comprises a cyclic olefin, an aromatic vinyl compound and an aliphatic α-olefin having from 2 to 20 carbon atoms in a specific compositional ratio and which has a glass-transition temperature (Tg) of lower than 60° C., and to films and sheets formed of the copolymer.

BACKGROUND ART

Soft polyvinyl chloride is desired to be substituted with chlorine-free olefin resins, in view of its environmental problems of wastes, etc. For olefin resins, for example, proposed are copolymers of propylene and α-olefins.

On the other hand, few ter-copolymers comprising a cyclic olefin, an aromatic vinyl compound and an α-olefin have heretofore been known. A ter-copolymer of that type is disclosed in Japanese Patent Laid-Open No. 287713/1998. However, it is a hard resin for optical materials and could not be a substitute for soft polyvinyl chloride.

The invention is to provide a novel olefin copolymer which has a suitable modulus of elasticity and can be a substitute for soft polyvinyl chloride as a soft resin and which has good elastic recovery and transparency, and also to provide films and sheets formed of the copolymer.

DISCLOSURE OF THE INVENTION

We, the present inventors have assiduously studied, and, as a result, have found out an olefin copolymer that solves the above-mentioned problems and also films and sheets formed of the copolymer, and have completed the present invention. The copolymer is a novel olefin ter-copolymer that comprises a cyclic olefin, an aromatic vinyl compound and an aliphatic α-olefin having from 2 to 20 carbon atoms in a specific compositional ratio and has a glass transition temperature (Tg) of lower than 60° C. Specifically, the invention provides an olefin copolymer mentioned below and films and sheets formed of the copolymer.

1. An olefin copolymer comprising [A] a cyclic olefin, [B] an aromatic vinyl compound and [C] an aliphatic α-olefin having from 2 to 20 carbon atoms, which is characterized in that (1) the component [A] accounts for from 0.1 to 30 mol %, the component [B] accounts for from 0.1 to 49.9 mol %, and the total of the components [A] and [B] accounts for from 0.2 to 50 mol %, and (2) the copolymer has a glass transition temperature Tg of lower than 60° C.

2. The olefin copolymer of above 1, wherein the component [A] accounts for from 0.1 to 10 mol %, the component [B] accounts for from 0.1 to 45 mol %, and the total of the components [A] and [B] accounts for from 0.2 to 50 mol %.

3. The olefin copolymer of above 1 or 2, of which the glass transition temperature Tg is lower than 30° C.

4. The olefin copolymer of any of above 1 to 3, of which the limiting viscosity [η] measured in decalin at 135° C. falls between 0.01 and 20 dl/g.

5. The olefin copolymer of any of above 1 to 4, of which the tensile modulus is at most 600 MPa.

6. The olefin copolymer of any of above 1 to 5, of which the internal haze is at most 20%.

7. The olefin copolymer of any of above 1 to 6, which is obtained by polymerizing a cyclic olefin, an aromatic vinyl compound and an aliphatic α-olefin having from 2 to 20 carbon atoms in the presence of an olefin polymerization catalyst that comprises (D) at least one selected from transition metal compounds of Groups 4 to 6 of the Periodic Table and transition metal compounds of Groups 8 to 10 of the Periodic Table of the following general formulae (1) to (4), and (E) at least one selected from a compound group of (e-1) oxygen-containing organometallic compounds, (e-2) ionic compounds capable of reacting with the transition metal compounds to form ionic complexes, and (e-3) clay, clay minerals and ion-exchanging layered compounds:

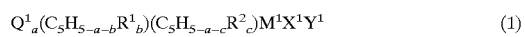

$Q^1{}_a(C_5H_{5-a-b}R^1{}_b)(C_5H_{5-a-c}R^2{}_c)M^1X^1Y^1$ (1)

$Q^2{}_a(C_5H_{5-a-d}R^3{}_d)Z^1M^1X^1Y^1$ (2)

$(C_5H_{5-e}R^4{}_e)M^1X^1Y^1W^1$ (3)

$L^1L^2M^2X^1Y^1$ (4)

wherein $Q^1$ represents a bonding group that crosslinks the two conjugated five-membered cyclic ligands ($C_5H_{5-a-b}R^1{}_b$) and ($C_5H_{5-a-c}R^2{}_c$); $Q^2$ represents a bonding group that crosslinks the conjugated five-membered cyclic ligand ($C_5H_{5-a-d}R^3{}_d$) and the group $Z^1$; $R^1$, $R^2$, $R^3$ and $R^4$ each represents a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represents an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 or Groups 8 to 10 of the Periodic Table; $M^2$ represents a transition metal of Groups 8 to 10 of the Periodic Table; $L^1$ and $L^2$ each represents a covalent-bonding or coordination-bonding ligand, and they may be bonded to each other; $X^1$, $Y^1$, $Z^1$ and $W^1$ each represents a covalent-bonding or ionic-bonding ligand, and $X^1$, $Y^1$ and $W^1$ may be bonded to each other.

8. Films and sheets formed of the olefin copolymer of any of above 1 to 7.

BEST MODES OF CARRYING OUT THE INVENTION

The invention is the olefin copolymer mentioned above, including films and sheets formed of the copolymer. The invention is described in detail hereinunder.

1. Olefin Copolymer

The olefin copolymer of the invention comprises [A] a cyclic olefin, [B] an aromatic vinyl compound and [C] an aliphatic α-olefin having from 2 to 20 carbon atoms, and is characterized in that;

(1) the component [A] accounts for from 0.1 to 30 mol %, the component [B] accounts for from 0.1 to 49.9 mol %, and the total of the components [A] and [B] accounts for from 0.2 to 50 mol %, and (2) the copolymer has a glass transition temperature Tg of lower than 60° C.

The olefin copolymer of the invention is a random ter-copolymer comprising the above-mentioned components [A], [B] and [C]. Its composition generally satisfies the above-mentioned (1), but is preferably such that the component [A] accounts for from 0.1 to 10 mol %, the component [B] accounts for from 0.1 to 45 mol %, and the total of the components [A] and [B] accounts for from 0.2 to 50 mol %.

If the amount of the component [A] therein is smaller than 0.1 mol %, the transparency of the copolymer is poor. If, however, it is larger than 30 mol %, the glass transition temperature of the copolymer is high and the copolymer could not serve as a soft resin. If the amount of the component [B] therein is larger than 49.9 mol %, the glass transition temperature of the copolymer is high and the copolymer could not serve as a soft resin. If the total of the components [A] and [B] is smaller than 0.2 mol %, the copolymer will inevitably have a melting point of the crystal caused by the component [C] therein, and could not serve as a soft resin. On the other hand, if the total of the components [A] and [B] is larger than 50 mol %, the glass transition temperature of the copolymer is high and the copolymer could not serve as a soft resin. Regarding the composition of the ter-copolymer, it is desirable that the amount of the component [A] is larger than that of the component [B] for better transparency of the copolymer.

The olefin copolymer of the invention has a glass transition point (Tg) of lower than 60° C., but preferably lower than 30° C., more preferably lower than 20° C. If the copolymer does not satisfy the above-mentioned requirements, it could not be a soft resin having a suitable modulus of elasticity and having good elastic recovery and transparency. On the other hand, however, if its Tg is lower than −30° C., the elastic recovery of the copolymer will be poor.

The cyclic olefin [A] for use in the invention is not specifically defined, including, for example, cyclic olefins of the following general formula (5):

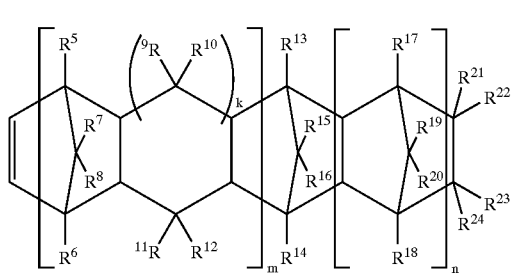

(5)

wherein k represents 0 or 1; m represents 0 or 1; n represents 0 or a natural number; $R^5$ to $R^{24}$ each independently represent a hydrogen atom, a halogen atom, a hydrocarbon group, an alkoxy group or an amino group.

The halogen atom is a fluorine, chlorine, bromine or iodine atom. The hydrocarbon group preferably has from 1 to 20 carbon atoms, concretely including a methyl group, an ethyl group, a propyl group, an isopropyl group, a butyl group, an isobutyl group, a t-butyl group, an amyl group, a hexyl group, an octyl group, a decyl group, a dodecyl group, an octadecyl group, a cyclohexyl group, a phenyl group, a naphthyl group, a tolyl group, a benzyl group, a phenylethyl group, an anthracenyl group, etc.

The alkoxy group preferably has from 1 to 20 carbon atoms, concretely including a methoxy group, an ethoxy group, a propoxy group, an isopropoxy group, a butoxy group, an isobutoxy group, a t-butoxy group, a phenoxy group, a 2,6-dimethylphenoxy group, a trimethylsiloxy group, etc.

The amino group preferably has from 1 to 20 carbon atoms, concretely including a dimethylamino group, a diethylamino group, a diisopropylamino group, a diphenylamino group, a pyrrolidinyl group, a bis(trimethylsilyl) amino group, etc.

$R^{21}$ to $R^{24}$ may be bonded to each other to form a monocyclic or polycyclic ring, and the monocyclic or polycyclic ring may have double bond(s). $R^{21}$ and $R^{22}$, or $R^{23}$ and $R^{24}$ may form an alkylidene group.

Specific examples of the cyclic olefins of formula (5) are bicyclo[2.2.1]hept-2-ene (norbornene); bicyclo[2.2.1]hept-2-ene derivatives such as 5-methylbicyclo[2.2.1]hept-2-ene, 5,6-dimethylbicyclo[2.2.1]hept-2-ene, 1-methylbicyclo[2.2.1]hept-2-ene, 5-ethylbicyclo[2.2.1]hept-2-ene, 5-n-butylbicyclo[2.2.1]hept-2-ene, 5-isobutylbicyclo[2.2.1]hept-2-ene, 7-methylbicyclo[2.2.1]hept-2-ene, etc.; tricyclo[4.3.0.1$^{2,5}$]-3-decene; tricyclo[4.3.0.1$^{2,5}$]-3-decene derivatives such as 2-methyltricyclo[4.3.0.1$^{2,5}$]-3-decene, 5-methyltricyclo[4.3.0.1$^{2,5}$]-3-decene, etc.; tricyclo[4.4.0.1$^{2,5}$]-3-undecene; tricyclo[4.4.0.1$^{2,5}$]-3-undecene derivatives such as 10-methyltricyclo[4.4.0.1$^{2,5}$]-3-undecene, etc.; tetracyclo[4.4.0.1$^{2,5}$.1$^{7,10}$]-3-dodecene; tetracyclo[4.4.0.1$^{2,5}$.1$^{7,10}$]-3-dodecene derivatives such as 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-butyltetracyclo[4.4.0.1$^{2,5}$.1$^{7,10}$]-3-dodecene, 8-isobutyltetracyclo[4.4.0.1$^{2,5}$.1$^{7,10}$]-3-dodecene, 8-hexyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-stearyltetracyclo[4.4.0.1$^{2,5}$.1$^{7,10}$]-3-dodecene, 5,10-dimethyltetracyclo[4.4.0.1$^{2,5}$.1$^{7,10}$]-3-dodecene, 2,10-dimethyltetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-ethyl-9-methyltetracyclo[4.4.0.1$^{2,5}$.1$^{7,10}$]-3-dodecene, 11-12-dimethyltetracyclo[4.4.0.1$^{2,5}$.1$^{7,10}$]-3-dodecene, 2,7,9-trimethyltetracyclo[4.4.0.1$^{2,5}$.1$^{7,10}$]-3-dodecene, 2,7-dimethyl-9-ethyltetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 9,10,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-ethyltetracyclo[4.4.0.1$^{2,5}$.1$^{7,10}$]-3-dodecene, 8-ethylidene-9-isopropyltetracyclo[4.4.0.1$^{2,5}$.1$^{7,10}$]-3-dodecene, 8-ethylidene-9-butyltetracyclo[4.4.0.1$^{2,5}$.1$^{7,10}$]-3-dodecene, 8-n-propylidenetetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo[4.4.0.1$^{2,5}$.1$^{7,10}$]-3-dodecene, 8-isopropylidene-9-ethyltetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-fluorotetracyclo[4.4.0.1$^{2,5}$.1$^{7,10}$]-3-dodecene, 8,9-dichlorotetracyclo[4.4.0.1$^{2,5}$.1$^{7,10}$]-3-dodecene, etc.; pentacyclo[6.5.1.1$^{3,6}$.0$^{2,7}$.0$^{9,13}$]-4-pentadecene; pentacyclo[6.5.1.1$^{3,6}$.0$^{2,7}$.0$^{9,13}$]-4-pentadecene derivatives such as 1,3-dimethylpentacyclo[6.5.1.1$^{3,6}$.0$^{2,7}$.0$^{9,13}$]-4-pentadecene, 1,6-dimethylpentacyclo[6.5.1.1$^{3,6}$.0$^{2,7}$.0$^{9,13}$]-4- pentadecene, 14,15-dimethylpentacyclo[6.5.1.1$^{3,6}$.0$^{2,7}$.0$^{9,13}$]-4-pentadecene, etc.; pentacyclo[7.4.0.1$^{2,5}$.1$^{9,12}$.0$^{8,13}$]-3-pentadecene; pentacyclo[7.4.0.1$^{2,5}$.1$^{9,12}$.0$^{8,13}$]-3-pentadecene derivatives such as methyl-substituted pentacyclo[7.4.0.1$^{2,5}$.1$^{9,12}$.0$^{8,13}$]-3-pentadecenes, etc.; pentacyclopentadecadiene compounds such as pentacyclo[6.5.1.1$^{3,6}$.0$^{2,7}$.0$^{9,13}$]-4,10-pentadecadiene, etc.; pentacyclo[8.4.0.1$^{2,5}$.1$^{9,12}$.0$^{8,13}$]-3-hexadecene; pentacyclo[8.4.0.1$^{2,5}$.1$^{9,12}$.0$^{8,13}$]-3-hexadecene derivatives such as 11-methylpentacyclo[8.4.0.1$^{2,5}$.1$^{9,12}$.0$^{8,13}$]-3-hexadecene, 11-ethylpentacyclo[8.4.0.1$^{2,5}$.1$^{9,12}$.0$^{8,13}$]-3-hexadecene, 10,11-dimethylpentacyclo[8.4.0.1$^{2,5}$.1$^{9,12}$.0$^{8,13}$]-3-hexadecene, etc.; pentacyclo[6.6.1.1$^{3,6}$.0$^{2,7}$.0$^{9,14}$]-4-hexadecene; pentacyclo[6.6.1.1$^{3,6}$.0$^{2,7}$.0$^{9,14}$]-4-hexadecene derivatives such as 1,3-dimethylpentacyclo[6.6.1.1$^{3,6}$.0$^{2,7}$.0$^{9,14}$]-4-hexadecene, 1,6-dimethylpentacyclo[6.6.1.1$^{3,6}$.0$^{2,7}$.0$^{9,14}$]-4-hexadecene, 15.16-dimethylpentacyclo[6.6.1.1$^{3,6}$.0$^{2,7}$.0$^{9,14}$]-4-hexadecene, etc.; hexacyclo[6.6.1.1$^{3,6}$.1$^{10,13}$.0$^{2,7}$.0$^{9,14}$]-4-heptadecene; hexacyclo[6.6.1.1$^{3,6}$.1$^{10,13}$.0$^{2,7}$.0$^{9,14}$]-4-heptadecene derivatives such as 12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,7}$.0$^{9,14}$]-4-heptadecene, 12-isobutylhexacyclo[6.6.1.1$^{3,6}$.1$^{10,13}$.0$^{2,7}$.0$^{9,14}$]-4-heptadecene, 1,6,10-trimethyl-12-isobutylhexacyclo[6.6.1.1$^{3,6}$.1$^{10,13}$.0$^{2,7}$.0$^{9,14}$]-4-heptadecene, etc.; heptacyclo-5-eicosene derivatives such as heptacyclo[8.7.0.1$^{2,9}$.1$^{4,7}$.1$^{11,17}$.0$^{3,8}$.0$^{12,15}$]-5-eicosene, etc.; heptacyclo[8.7.0.1$^{3,6}$.1$^{10,17}$.1$^{12,15}$.0$^{2,7}$.0$^{11,16}$]-4-eicosene; heptacyclo[8.7.0.1$^{3,6}$.1$^{10,17}$.1$^{12,15}$.0$^{2,7}$.0$^{11,16}$]-4-eicosene derivatives such as dimethyl-substituted heptacyclo[8.7.0.1$^{3,6}$.1$^{10,17}$.1$^{12,15}$.0$^{2,7}$.0$^{11,16}$]-4-eicosenes, etc.; heptacyclo-5-heneicosene derivatives such as heptacyclo[8.8.0.1$^{2,9}$.1$^{4,7}$.1$^{11,18}$.0$^{3,8}$.0$^{12,17}$]-5-heneicosene, heptacyclo[8.8.0.1$^{4,7}$.1$^{11,18}$.1$^{13,16}$.0$^{3,8}$.0$^{12,17}$]-5-heneicosene, 15-methylheptacyclo[8.8.0.1$^{4,7}$.1$^{11,18}$.1$^{13,16}$.0$^{3,8}$.0$^{12,17}$]-5-heneicosene, trimethyl-substituted heptacyclo[8.8.0.1$^{4,7}$.1$^{11,18}$.0$^{3,8}$.0$^{12,17}$]-5-heneicosene, etc.; octacyclo[8.8.0.1$^{2,9}$.1$^{4,7}$.1$^{11,18}$.1$^{13,16}$.0$^{3,8}$.0$^{12,17}$]-5-docosene; octacyclo[8.8.0.1$^{2,9}$.1$^{4,7}$.1$^{11,18}$.1$^{13,16}$.0$^{3,8}$.0$^{12,17}$]-5-docosene derivatives such as 15-methyloctacyclo[8.8.0.1$^{2,9}$.1$^{4,7}$.1$^{11,18}$.1$^{13,16}$.0$^{3,8}$.0$^{12,17}$]-5-docosene, 15-ethyloctacyclo[8.8.0.1$^{2,9}$.1$^{4,7}$.1$^{11,18}$.1$^{13,16}$.0$^{3,8}$.0$^{12,17}$]-5-docosene, etc.; nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene; nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as trimethyl-substituted nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosenes, etc.; nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene and nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives; 5-phenylbicyclo[2.2.1]hept-2-ene, 5-methyl-5-phenylbicyclo[2.2.1]hept-2-ene, 5-benzylbicyclo[2.2.1]hept-2-ene, 5-tolylbicyclo[2.2.1]hept-2-ene, 5-(ethylphenyl)bicyclo[2.2.1]hept-2-ene, 5-(isopropylphenyl)bicyclo[2.2.1]hept-2-ene, 5-biphenylbicyclo[2.2.1]hept-2-ene, 5-(β-naphthyl)bicyclo[2.2.1]hept-2-ene, 5-(α-naphthyl)bicyclo[2.2.1]hept-2-ene, 5-anthracenylbicyclo[2.2.1]hept-2-ene, 5.6-diphenylbicyclo[2.2.1]hept-2-ene, cyclopentadiene-acenaphthylene adduct, 1,4-methano-1,4,4a,9a-tetrahydrofluorene, 1,4-methano-1,4,4a,5,10,10a-hexahydroanthracene, 8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene, 8-benzyltetracyclo[4.4.0.1$^{2,5}$.1$^{7,10}$]-3-dodecene, 8-tolyltetracyclo[4.4.0.1$^{2,5}$.1$^{7,10}$]-3-dodecene, 8-(ethylphenyl)tetracyclo[4.4.0.1$^{2,5}$.1$^{7,10}$]-3-dodecene, 8-(isopropylphenyl)tetracyclo[4.4.0.1$^{2,5}$.1$^{7,10}$]-3-dodecene, 8,9-diphenyltetracyclo[4.4.0.1$^{2,5}$.1$^{7,10}$]-3-dodecene, 8-biphenyltetracyclo[4.4.0.1$^{2,5}$.1$^{7,10}$]-3-dodecene, 8-(β-naphthyl)tetracyclo[4.4.0.1$^{2,5}$.1$^{7,10}$]-3-dodecene, 8-(α-naphthyl)tetracyclo[4.4.0.1$^{2,5}$.1$^{7,10}$]-3-dodecene, 8-anthracenyltetracyclo[4.4.0.1$^{2,5}$.1$^{7,10}$]-3-dodecene, cyclopentadiene-cyclopentadiene-acenaphtylene adduct, 11,12-benzopentacyclo[6.5.1.1$^{3,6}$.0$^{2,7}$.0$^{9,13}$]-4-pentadecene, 11,12-benzopentacyclo[6.6.1.1$^{3,6}$.0$^{2,7}$.0$^{9,14}$]-4-hexadecene, 11-phenylhexacyclo[6.6.1.1$^{3,6}$.1$^{10,13}$.0$^{2,7}$.0$^{9,14}$]-4-heptadecene, 14,15-benzoheptacyclo[8.7.0.1$^{2,9}$.1$^{4,7}$.1$^{11,17}$.0$^{3,8}$.0$^{12,16}$]-5-eicosene, etc.

One or more of these cyclic olefins of formula (5), optionally as combined, may be used herein.

The aromatic vinyl compound [B] for use in the invention includes styrene; alkylstyrenes such as p-methylstyrene, p-ethylstyrene, p-propylstyrene, p-isopropylstyrene, p-butylstyrene, p-tert-butylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3, 5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; as well as p-phenylstyrene, p-trimethylsilylstyrene, vinyl benzoate, divinylbenzene, etc. One or more of these aromatic vinyl compounds, optionally as combined, may be used herein.

The aliphatic α-olefin [C] having from 2 to 20 carbon atoms for use in the invention includes, for example, α-olefins such as ethylene, propylene, 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic diolefins having a double bond at the α-position such as butadiene, isoprene, 1,4-pentadiene, 1,5-hexadiene, etc. One or more of these α-olefins, optionally as combined, may be used herein.

The limiting viscosity [η] measured in decalin at 135° C. of the olefin copolymer of the invention may fall generally between 0.01 and 20 dl/g, but preferably between 0.1 and 15 dl/g, more preferably between 0.2 and 10 dl/g, even more preferably between 0.2 and 5 dl/g. If its [η] is smaller than 0.01 dl/g, the strength of the moldings such as films and sheets of the copolymer will be low, and the moldings will be sticky. On the other hand, if its [η] is larger than 20 dl/g, the flowability of the copolymer will be low and the moldability thereof will be poor. In case where the olefin copolymer of the invention is used as a substitute for soft polyvinyl chloride, its [η] preferably falls between 0.5 and 1.5 dl/g. In case where the copolymer is used as a hot-melt adhesive, its [η] is preferably at most 0.5 dl/g.

Preferably, the tensile modulus of the olefin copolymer of the invention is at most 600 MPa. If its tensile modulus is larger than 600 MPa, the copolymer could not be elastic and could not serve as a soft resin. On the other hand, the lowermost limit of the tensile modulus of the copolymer may be, for example, at least 2 MPa. If its tensile modulus is lower than the lowermost limit, the moldings such as films and sheets of the copolymer will lose toughness. More preferably, the tensile modulus of the copolymer falls between 5 MPa and 200 MPa, even more preferably between 5 MPa and 100 MPa.

Preferably, the internal haze of the olefin copolymer of the invention is at most 20%. If its internal haze is larger than 20%, the copolymer will be poorly transparent, and its latitude in decoration and design will be limited.

Preferably, the elastic recovery of the olefin copolymer of the invention falls between 20% and 100%, more preferably between 40% and 100%. If its elastic recovery is lower than 20%, the moldings such as films and sheets of the copolymer will be wrinkled or loosened.

Preferably, the olefin copolymer of the invention is obtained by polymerizing a cyclic olefin, an aromatic vinyl compound and an aliphatic α-olefin having from 2 to 20 carbon atoms in the presence of an olefin polymerization catalyst that comprises (D) at least one selected from transition metal compounds of Groups 4 to 6 of the Periodic Table and transition metal compounds of Groups 8 to 10 of the Periodic Table of the following general formulae (1) to (4), and (E) at least one selected from a compound group of (e-1) oxygen-containing organometallic compounds, (e-2) ionic compounds capable of reacting with the transition metal compounds to form ionic complexes, and (e-3) clay, clay minerals and ion-exchanging layered compounds.

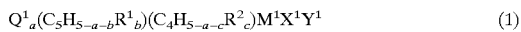  (1)

  (2)

  (3)

  (4)

wherein $Q^1$ represents a bonding group that crosslinks the two conjugated five-membered cyclic ligands ($C_5H_{5-a-b}R^1_b$) and ($C_5H_{5-a-c}R^2_c$); $Q^2$ represents a bonding group that crosslinks the conjugated five-membered cyclic ligand ($C_5H_{5-a-d}R^3_d$) and the group $Z^1$; $R^1$, $R^2$, $R^3$ and $R^4$ each represents a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represents an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 or Groups 8 to 10 of the Periodic Table; $M^2$ represents a transition metal of Groups 8 to 10 of the Periodic Table; $L^1$ and $L^2$ each represents a covalent-bonding or coordination-bonding ligand, and they may be bonded to each other; $X^1$, $Y^1$, $Z^1$ and $W^1$ each represents a covalent-bonding or ionic-bonding ligand, and $X^1$, $y^1$ and $W^1$ may be bonded to each other.

$Q^1$ and $Q^2$ in formulae (1) and (2) are bonding groups, and their specific examples are mentioned below.

(1) An alkylene group having from 1 to 4 carbon atoms, or a cycloalkylene group, or the group substituted by a lower alkyl or phenyl group at its side chain, such as a methylene group, an ethylene group, an isopropylene group, a methylphenylmethylene group, a diphenylmethylene group, a cyclohexylene group, etc.;

(2) A silylene group, or an oligosilylene group, or the group substituted by a lower alkyl or phenyl group at its side chain, such as a silylene group, a dimethylsilylene group, a methylphenylsilylene group, a diphenylsilylene group, a disilylene group, a tetramethyldisilylene group, etc.;

(3) A hydrocarbon group (e.g., a lower alkyl group, a phenyl group, a hydrocarbyloxy group (preferably, a lower alkoxy group), etc.) containing germanium, phosphorus, nitrogen, boron or aluminum, such as a $(CH_3)_2Ge$ group, a $(C_6H_5)_2Ge$ group, a $(CH_3)P$ group, a $(C_6H_5)P$ group, a $(C_4H_9)N$ group, a $(C_6H_5)N$ group, a $(CH_3)B$ group, a $(C_4H_9)B$ group, a $(C_6H_5)B$ group, a $(C_6H_5)Al$ group, a $(CH_3O)Al$ group, etc.

Of those, preferred for $Q^1$ and $Q^2$ are alkylene groups having from 1 to 4 carbon atoms, and silylene groups.

$(C_5H_{5-a-b}R^1_b)(CH_{5-a-c}R^2_c)$ and $(C_5H_{5-a-d}R^3_d)$ are conjugated, 5-membered cyclic ligands, in which $R^1$, $R^2$ and $R^3$ each represents a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; a represents 0, 1 or 2; and b, c and d each represents an integer of from 0 to 5 when a=0, or an integer of from 0 to 4 when a=1, or an integer of from 0 to 3 when a=2. The hydrocarbon group preferably has from 1 to 20 carbon atoms, more preferably from 1 to 12 carbon atoms. The hydrocarbon group may be a monovalent one that bonds to the cyclopentadienyl group of the conjugated, 5-membered cyclic group. Two of plural hydrocarbon groups, if any, may be bonded to each other to form a cyclic structure along with a part of the cyclopentadienyl group. Specific examples of those conjugated, 5-membered cyclic ligands are substituted or unsubstituted cyclopentadienyl groups, indenyl groups and fluorenyl groups.

The halogen atom includes chlorine, bromine, iodine and fluorine atoms. The alkoxy group preferably has from 1 to 12 carbon atoms.

The silicon-containing hydrocarbon group includes, for example, groups of $-Si(R^{25})(R^{26})(R^{27})$, in which $R^{25}$, $R^{26}$ and $R^{27}$ each represents a hydrocarbon group having from 1 to 24 carbon atoms. As the phosphorus-containing hydrocarbon group, the nitrogen-containing hydrocarbon group and the boron-containing hydrocarbon group, for example, mentioned are groups of $-P(R^{28})(R^{29})$, $-N(R^{28})(R^{29})$, and $-B(R^{26})(R^{29})$, respectively, in which $R^{28}$ and $R^{29}$ each represents a hydrocarbon group having from 1 to 18 carbon atoms. Plural $R^1$'s, $R^2$'s and $R^3$'s, if any, may be the same or different ones, respectively. In formula (1), the conjugated, 5-membered cyclic ligands $(C_5H_{5-a-b}R^1_b)$ and $(C_5H_{5-a-c}R^2_c)$ may be the same or different ones.

$M^1$ represents a transition metal element of Groups 4 to 6 and Groups 8 to 10 of the Periodic Table, including, for example, titanium, zirconium, hafnium, vanadium, niobium, molybdenum, tungsten, iron, cobalt, nickel, palladium, platinum, etc. Of those, preferred are titanium, zirconium, hafnium, iron, nickel and palladium.

$Z^1$ represents a covalent-bonding ligand, including, for example, oxygen (—O—), sulfur (—S—), an alkoxy group having from 1 to 20, preferably from 1 to 10 carbon atoms, a thioalkoxy group having from 1 to 20, preferably from 1 to 12 carbon atoms, a nitrogen-containing hydrocarbon group having from 1 to 40, preferably from 1 to 18 carbon atoms, and a phosphorus-containing hydrocarbon group having from 1 to 40, preferably from 1 to 18 carbon atoms.

$X^1$ and $Y^1$ each represents a covalent-bonding or ionic-bonding ligand, including, for example, a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are a hydrogen atom, a halogen atom, a hydrocarbon group, and an alkoxy group. $X^1$ and $Y^1$ may be the same or different.

In formula (3), $M^1$ represents a transition metal of Groups 4 to 6 and Groups 8 to 10 of the Periodic Table, like in the above; $W^1$ represents a covalent-bonding or ionic-bonding ligand, including, for example, a hydrogen atom, a halogen atom, a hydrocarbon group having from 1 to 20, preferably from 1 to 10 carbon atoms, an alkoxy group having from 1 to 30, preferably from 1 to 20 carbon atoms, an amino group, an amidinato group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are a halogen atom, a hydrocarbon group, and an alkoxy group.

In formula (4), $L^1$ and $L^2$ each represents a covalent-bonding or coordination-bonding ligand, and they may be bonded to each other. Specific examples of $L^1$ and $L^2$ are a hydrocarbon group having from 1 to 20, preferably from 1 to 10 carbon atoms, an alkoxy group having from 1 to 30, preferably from 1 to 20 carbon atoms, an amino group, an amidinato group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine, bistrimethylsilylaminobistrimethylsilyliminophospholane, etc.

$X^1$ and $Y^1$ each represents a covalent-bonding or ionic-bonding ligand, and they may be bonded to each other. As described hereinabove, specific examples of $X^1$ and $Y^1$ are a hydrogen atom, a halogen atom, a hydrocarbon group having from 1 to 20, preferably from 1 to 10 carbon atoms, an alkoxy group having from 1 to 20, preferably from 1 to 10 carbon atoms, an amino group, a phosphorus-containing hydrocarbon group having from 1 to 20, preferably from 1 to 12 carbon atoms (e.g., a diphenylphosphine group, etc.), a silicon-containing hydrocarbon group having from 1 to 20, preferably from 1 to 12 carbon atoms (e.g., a trimethylsilyl group, etc.), and a boron compound residue having a hydrocarbon group with from 1 to 20, preferably from 1 to 12 carbon atoms or having halogens (e.g., $B(C_6H_5)_4$, $BF_4$). Of those, preferred are a halogen atom and a hydrocarbon group. $X^1$ and $Y^1$ may be the same or different.

$M^2$ represents a transition metal of Groups 8 to 10 of the Periodic Table, including, for example, nickel, palladium, platinum, iron, cobalt, rhodium, ruthenium, etc. Preferred are iron, nickel and palladium.

Specific examples of the transition metal compounds of formulae (1) and (2) are compounds <1> to <7> mentioned below. In these, the position of each substituent is designated as follows:

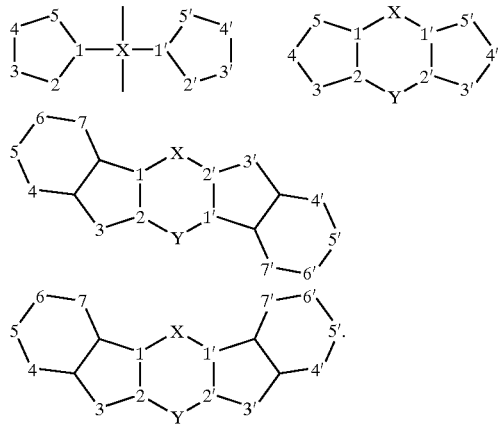

<1> Transition metal compounds not having a crosslinkable bonding group but having two conjugated, 5-membered cyclic ligands, such as bis(cyclopentadienyl)titanium dichloride, bis(methylcyclopentadienyl)titanium dichloride, bis(1,3-dimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(n-butylcyclopentadienyl)titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titanium dichloride, (cyclopentadienyl)(fluorenyl)titanium dichloride, etc.;

<2> Transition metal compounds having two conjugated, 5-membered cyclic ligands, in which the two ligands are crosslinked with an alkylene group, such as rac-methylenebis(indenyl)titanium dichloride, rac-ethylenebis(indenyl)titanium dichloride, rac-methylenebis(indenyl)titanium chlorohydride, rac-ethylenebis(indenyl)methyltitanium chloride, rac-ethylenebis(indenyl)methoxychlorotitanium, rac-ethylenebis(indenyl)titanium diethoxide, rac-ethylenebis(indenyl)dimethyltitanium, rac-ethylenebis(4,5,6,7-tetrahydroindenyl)titanium dichloride, rac-ethylenebis(2-methylindenyl)titanium dichloride, rac-ethylenebis(2,4-dimethylindenyl)titanium dichloride, rac-ethylenebis(2-methyl-4-trimethylsilylindenyl)titanium dichloride, rac-ethylenebis(2,4-dimethyl-4,5,6,7-tetrahydroindenyl)titanium dichloride, ethylene(2,4-dimethylcyclopentadienyl)(3',5'-dimethylcyclopentadienyl)titanium dichloride, ethylene(2-methyl-4-tert-butylcyclopentadienyl)(3'-tert-butyl-5'-methylcyclopentadienyl)titanium dichloride, ethylene(2,3,5-trimethylcyclopentadienyl)(2',4',5'-trimethylcyclopentadienyl)titanium dichloride, rac-isopropylidenebis(indenyl)titanium dichloride, rac-isopropylidenebis(4,5,6,7-tetrahydroindenyl)titanium dichloride, rac-isopropylidenebis(2-methylindenyl)titanium dichloride, rac-isopropylidenebis(2,4-dimethylindenyl)titanium dichloride, rac-isopropylidenebis(4,5-benzoindenyl)titanium dichloride, isopropylidene(2,4-dimethylcyclopentadienyl)(3',5'-dimethylcyclopentadienyl)titanium dichloride, isopropylidene(2-methyl-4-tert-butylcyclopentadienyl)(3'-tert-butyl-5'- methylcyclopentadienyl)titanium dichloride, methylene (cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene (cyclopentadienyl)(3,4-dimethylcyclopentadienyl) diphenyltitanium, methylene(cyclopentadienyl) (trimethylcyclopentadienyl)titanium dichloride, methylene (cyclopentadienyl)(tetramethylcyclopentadienyl)titanium dichloride, isopropylidene(cyclopentadienyl)(3,4-dimethylcyclopentadienyl)titanium dichloride, isopropylidene(cyclopentadienyl) (tetramethylcyclopentadienyl)titanium dichloride, isopropylidene(cyclopentadienyl)(3-methylindenyl) titanium dichloride, isopropylidene(cyclopentadienyl) (fluorenyl)titanium dichloride, isopropylidene(2-methylcyclopentadienyl)(fluorenyl)titanium dichloride, isopropylidene(2,5-dimethylcyclopentadienyl)(3',41'-dimethylcyclopentadienyl)titanium dichloride, isopropylidene(2,5-dimethylcyclopentadienyl)(fluorenyl) titanium dichloride, ethylene(cyclopentadienyl)(2,4-dimethylcyclopentadienyl)titanium dichloride, ethylene (cyclopentadienyl)(fluorenyl)titanium dichloride, ethylene (2,5-dimethylcyclopentadienyl)(fluorenyl)titanium dichloride, ethylene(2,5-diethylcyclopentadienyl) (fluorenyl)titanium dichloride, diphenylmethylene (cyclopentadienyl)(3,4-diethylcyclopentadienyl)titanium dichloride, diphenylmethylene(cyclopentadienyl)(3,4-diethylcyclopentadienyl)titanium dichloride, cyclohexylidene(cyclopentadienyl)(fluorenyl)titanium dichloride, cyclohexylidene(2,5-dimethylcyclopentadienyl) (3',4'-dimethylcyclopentadienyl)titanium dichloride, etc.:

<3> Transition metal compounds having two silylene-crosslinked, conjugated, 5-membered cyclic ligands, such as rac-dimethylsilylenebis(indenyl)titanium dichloride, rac-dimethylsilylenebis(4,5,6,7-tetrahydroindenyl)titanium dichloride, rac-dimethylsilylenebis(2-methylindenyl) titanium dichloride, rac-dimethylsilylenebis(2,4-dimethylindenyl)titaniumdichloride, rac-dimethylsilylenebis(2-methyl-4-phenylindenyl)titanium dichloride, rac-dimethylsilylenebis(2,7-dimethyl-4-phenylindenyl)titanium dichloride, rac-dimethylsilylenebis (2-methyl-4-naphthylindenyl)titanium dichloride, rac-dimethylsilylenebis(4,5-benzoindenyl)titanium dichloride, rac-dimethylsilylenebis(2-methyl-4,5-benzoindenyl) titanium dichloride, dimethylsilylenebis(2,4-dimethylcyclopentadienyl)(3',5'-dimethylcyclopentadienyl) titanium dichloride, rac-phenylmethylsilylenebis(indenyl) titanium dichloride, rac-phenylmethylsilylenebis(4,5,6,7-tetrahydroindenyl)titanium dichloride, rac-phenylmethylsilylenebis(2,4-dimethylindenyl)titanium dichloride, phenylmethylsilylene(2,4-dimethylcyclopentadienyl)(3',5'-dimethylcyclopentadienyl) titanium dichloride, phenylmethylsilylene(2,3,5-trimethylcyclopentadienyl)(2',4',5'-trimethylcyclopentadienyl)titanium dichloride, phenylmethylsilylenebis(tetramethylcyclopentadienyl) titanium dichloride, rac-diphenylsilylenebis(2,4-dimethylindenyl)titanium dichloride, rac-diphenylsilylenebis(indenyl)titanium dichloride, rac-diphenylsilylenebis(2-methylindenyl)titanium dichloride, rac-tetramethyldisilylenebis(indenyl)titanium dichloride, tetramethyldisilylenebis(cyclopentadienyl)titanium dichloride, tetramethyldisilylene(3-methylcyclopentadienyl)(indenyl)titanium dichloride, dimethylsilylene(cyclopentadienyl)(3,4-dimethylcyclopentadienyl)titanium dichloride, dimethylsilylene-(cyclopentadienyl)(2,3,5-trimethylcyclopentadienyl)titanium dichloride, dimethylsilylene-(cyclopentadienyl) (tetramethylcyclopentadienyl)titanium dichloride, dimethylsilylene(cyclopentadienyl)(3,4-diethylcyclopentadieny)titanium dichloride, dimethylsilylene(cyclopentadienyl)(2,3,5-triethylcyclopentadienyl)titanium dichloride, dimethylsilylene(cyclopentadienyl) (tetraethylcyclopentadienyl)titanium dichloride, dimethylsilylene(cyclopentadienyl)(fluorenyl)titanium dichloride, dimethylsilylene(cyclopentadienyl)(2,7-di-tert-butylfluorenyl)titanium dichloride, dimethylsilylene (cyclopentadienyl)(octahydrofluorenyl)titanium dichloride, dimethylsilylene(2-methylcyclopentadienyl)(fluorenyl) titanium dichloride, dimethylsilylene(2,5-dimethylcyclopentadlenyl)(fluorenyl)titanium dichloride, dimethylsilylene(2-ethylcyclopentadienyl)(fluorenyl) titanium dichloride, dimethylsilylene(2,5-diethylcyclopentadienyl)(fluorenyl)titanium dichloride, diethylsilylene(2-methylcyclopentadienyl)(2',7'-di-tert-butylfluorenyl)titanium dichloride, dimethylsilylene(2,5-dimethylcyclopentadienyl)(2',7'-di-tert-butylfluorenyl) titanium dichloride, dimethylsilylene(2-ethylcyclopentadienyl)(2',7'-di-tert-butylfluorenyl)titanium dichloride, dimethylsilylene(2,4-diethylcyclopentadienyl) (2',7'-di-tert-butylfluorenyl)titanium dichloride, dimethylsilylene(methylcyclopentadienyl) (octahydrofluorenyl)titanium dichloride, dimethylsilylene (2,4-dimethylcyclopentadienyl)(octahydrofluorenyl) titanium dichloride, dimethylsilylene (ethylcyclopentadienyl)(octahydrofluorenyl)titanium dichloride, dimethylsilylene(2,4-diethylcyclopentadienyl) (octahydrofluorenyl)titanium dichloride, etc.;

<4> Transition metal compounds having two conjugated, 5-membered cyclic ligands, in which the two ligands are crosslinked with a germanium-, aluminum-, boron-, phosphorus- or nitrogen-containing hydrocarbon group, such as rac-dimethylgermylenebis(indenyl)titanium dichloride, dimethylgermylene(cyclopentadienyl) (fluorenyl)titanium dichloride, rac-methylalumylenebis (indenyl)titanium dichloride, rac-phenylamylenebis (indenyl) titanium dichloride, rac-phenylphosphylenebis (indenyl)titanium dichloride, rac-ethylborylenebis(indenyl) titanium dichloride, rac-phenylalumylenebis(indenyl) titanium dichloride, phenylalumylene(cyclopentadienyl) (fluorenyl)titanium dichloride, etc.;

<5> Transition metal compounds having one conjugated, 5-membered cyclic ligand, such as (pentamethylcyclopentadieny)[bis(phenyl)amino]titanium dichloride, (indenyl)[bis(phenyl)amino]titanium dichloride, (pentamethylcyclopentadienyl)[bis(trimethylsilyl)amino] titanium dichloride, (pentamethylcyclopentadienyl) phenoxytitanium dichloride, dimethylsilylene (tetramethylcyclopentadienyl)(tert-butylamino)titanium dichloride, dimethylsilylene(tetrahydroindenyl) methylaminotitanium dichloride, dimethylsilylene (tetramethylcyclopentadienyl)(trimethylsilylamino)titanium dichloride, dimethylsilylene(tetramethylcyclopentadienyl) (benzylamino)titanium dichloride, dimethylsilylene (tetramethylcyclopentadienyl)phenylaminotitanium dichloride, dimethylsilylene(tetrahydroindenyl) decylaminotitanium dichloride, dimethylsilylene (tetrahydroindenyl)(trimethylsilylamino)titanium dichloride, dimethylsilylene(2-indenyl)(tert-butylamino) titanium dichloride, dimethylsilylene(2-indenyl)

(isopropylamino)titanium dichloride, dimethylsilylene(2-indenyl)(benzylamino)titanium dichloride, dimethylgermylene(tetramethylcyclopentadienyl)phenylaminotitanium dichloride, etc.;

<6> Transition metal compounds having two conjugated, 5-membered cyclic ligands in which the ligands are double-crosslinked, such as (1,1'-dimethylsilylene)(2,2'-isopropylidene)bis(cyclopentadienyl)titanium dichloride, (1,1'-dimethylsilylene)(2,2'-isopropylidene)bis(cyclopentadienyl)dimethyltitanium, (1,1'-dimethylsilylene)(2,2'-isopropylidene)bis(cyclopentadienyl)dibenzyltitanium, (1,1'-dimethylsilylene)(2,2'-isopropylidene)bis(cyclopentadienyl)bis(trimethylsilyl)titanium, (1,1'-dimethylsilylene)(2,2'-isopropylidene)bis(cyclopentadienyl)bis(trimethylsilylmethyl)titanium, (1,1'-dimethylsilylene)(2,2'-dimethylsilylene)bis(cyclopentadienyl)titanium dichloride, (1,1'-dimethylsilylene)(2,2'-dimethylsilylene)bis(3,5-dimethylcyclopentadienyl)titanium dichloride, (1,1'-dimethylsilylene)(2,2'-dimethylsilylene)bis(3,4,5-trimethylcyclopentadienyl)titanium dichloride, (1,1'-dimethylsilylene)(2,2'-dimethylsilylene)(cyclopentadienyl)(3,5-dimethylcyclopentadienyl)titanium dichloride, (1,1'-dimethylsilylene)(2,2'-dimethylsilylene)(cyclopentadienyl)(3,4,5-trimethylcyclopentadienyl)titanium dichloride, (1,1'-dimethylsilylene)(2,2'-dimethylsilylene)(4-methylcyclopentadienyl)(3',5'-dimethylcyclopentadienyl)titanium dichloride, (1,2'-dimethylsilylene)(2,1'-dimethylsilylene)bis(indenyl)titanium dichloride, (1,2'-dimetbylsilylene)(2,1'-dimethylsilylene)bis(3-methylindenyl)titanium dichloride, (1,2'-dimethylsilylene)(2,1'-dimethylsilylene)bis(4,7-dimethylindenyl)titanium dichloride, (1,2'-dimethylsilylene)(2,1'-dimethylsilylene)bis(4,5-benzoindenyl)titanium dichloride, (1,2'-dimethylsilylene)(2,1'-dimethylsilylene)bis(5,6-benzoindenyl)titanium dichloride, (1,2'-dimethylsilylene)(2,1'-ethylene)bis(indenyl)titanium dichloride, (1,1'-dimethylsilylene)(2,2'-ethylene)bis(indenyl)titanium dichloride, (1,1'-ethylene)(2,2'-dimethylsilylene)bis(indenyl)titanium dichloride, (1,1'-dimethylsilylene)(2,2'-cyclohexylidene)bis(indenyl)titanium dichloride, (1,2'-ethylene)(2,1'-ethylene)bis(indenyl)titanium dichloride, (1,2'-ethylene)(2,1'-ethylene)bis(3-methylindenyl)titanium dichloride, (1,2'-ethylene)(2,1'-ethylene)bis(4,7-dimethylindenyl)titanium dichloride, (1,2'-ethylene(2,1'-ethylene)bis(5,6-dimethylindenyl)titanium dichloride, (1,2'-ethylene)(2,1'-ethylene)bis(4-phenylindenyl)titanium dichloride, (1,2'-ethylene)(2,1'-ethylene)bis(4,5,6,7-tetrahydroindenyl)titanium dichloride, (1,2'-ethylene)(2,1'-ethylene)bis(4,5-benzoindenyl)titanium dichloride, (1,2'-ethylene)(2,1'-ethylene)bis(5,6-benzoindenyl)titanium dichloride, etc.;

<7> Derivatives from compounds of (1) to (6) noted above, which are produced by substituting the chlorine atoms in those compounds of (1) to (6) with any of a bromine atom, an iodine atom, a hydrogen atom, a methyl group, a phenyl group and others, and by substituting the center metal, titanium in those transition metal compounds with any of zirconium, hafnium, vanadium, niobium, molybdenum, tungsten and others.

Specific examples of the transition metal compounds of formula (3) are mentioned below.

Cyclopentadienyltitanium trichloride, methylcyclopentadienyltitanium trichloride, (1,3-dimethylcyclopentadienyl)titanium trichloride, (1,2,4-trimethylcyclopentadienyl)titanium trichloride, tetramethylcyclopentadienyltitanium trichloride, pentamethylcyclopentadienyltitanium trichloride, n-butylcyclopentadienyltitanium trichloride, indenyltitanium trichloride, fluorenyltitanium trichloride, cyclopentadienyltitanium dichlorohydride, cyclopentadienylmethyltitanium dichloride, cyclopentadienylethyltitanium dichloride, tetrahydroindenyltitanium trichloride, 2-methylindenyltitanium trichloride, octahydrofluorenyltitanium trichloride, pentamethylcyclopentadienyltitanium trimethoxide, pentamethylcyclopentadienyltitanium trichloride, cyclopentadienyl[bis(trimethylsilyl)benzamidinato]titanium dichloride, cyclopentadienyl(dimethylbenzamidinato)titanium dichloride, cyclopentadienyl(dicyclohexylacetamidinato)titanium dichloride; and derivatives from these compounds, which are produced by substituting the chlorine atoms in these compounds with any of a bromine atom, an iodine atom, a hydrogen atom, a methyl group, a phenyl group and others, and by substituting the center metal, titanium in these transition metal compounds with any of zirconium, hafnium, vanadium, niobium, molybdenum, tungsten and others.

Specific examples of the transition metal compounds of formula (4) are 2,2'-thiobis(6-tert-butyl-4-methylphenoxy)titanium dichloride, [1,3-bis(2,6-diisopropylphenylaminato)propane]titanium dichloride, bis[bis(trimethylsilyl)benzamidinato]zirconium dichloride, bis(dimethylbenzamidinato)zirconium dichloride, bis(dicyclohexylacetamidinato)zirconium dichloride, dibromobistriphenylphosphine-nickel, dichlorobistrifluorophenylphosphine-nickel, dibromodiacetonitrile-nickel, dibromodibenzonitrile-nickel, dibromo(1,2-bisdiphenylphosphinoethane)nickel, dibromo(1,3-bisdiphenylphosphinopropane)nickel, dibromo(1,1'-diphenylbisphosphinoferrocene)nickel, dimethylbisdiphenylphosphine-nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine-nickel, dichlorobistriphenylphosphine-palladium, dichlorodibenzonitrile-palladium, dichlorodiacetonitrile-palladium, dichloro(1,2-bisdiphenylphosphinoethane)palladium, bistriphenylphosphine-palladium bistetrafluoroborate, bis(2,2'-bipyridine)methyl-iron tetrafluoroborate etherate, 1,4,7-triazacyclononane-1,4,7-triyl-titanium chloride, 7-methyl-1,4,7-triazacyclononane-1,4-diyl-titaniumdichloride, 4,7-dimethyl-1,4,7-triazacyclononan-1-yl-titanium trichloride, etc. Other preferred examples of the compounds are those having a diimine ligand, including, for example, complex compounds of a general formula (6):

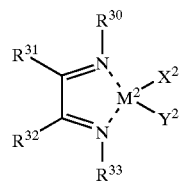

wherein $R^{30}$ and $R^{33}$ each independently represents an aliphatic hydrocarbon group having from 1 to 20 carbon atoms, or an aromatic group having a hydrocarbon group on the ring and having from 7 to 20 carbon atoms in total; $R^{31}$ and $R^{32}$ each independently represents a hydrogen atom, or a hydrocarbon group having from 1 to 20 carbon atoms, and $R^{31}$ and $R^{32}$ may be bonded to each other to form a ring; $X^2$ and $Y^2$ each independently represent a hydrogen atom, or a hydrocarbon group having from 1 to 20 carbon atoms; and $M^2$ represents a transition metal of Groups 8 to 10 of the Periodic Table.

In formula (6), the aliphatic hydrocarbon group having from 1 to 20 carbon atoms for $R^{30}$ and $R^{33}$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group or the like may be introduced.

The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^{30}$ and $R^{33}$, preferred is an aromatic group having a hydrocarbon group on the ring, and especially preferred is a 2,6-diisopropylphenyl group. $R^{30}$ and $R^{33}$ may be the same or different.

The hydrocarbon group having from 1 to 20 carbon atoms for $R^{31}$ and $R^{32}$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^{31}$ and $R^{32}$, referred to are those of the C1–20 aliphatic hydrocarbon group mentioned hereinabove for $R^{30}$ and $R^{33}$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^{30}$ and $R^{31}$ may be the same or different, and may be bonded to each other to form a ring.

For examples of the hydrocarbon group having from 1 to 20 carbon atoms for $X^2$ and $Y^2_1$, referred to are those of the C1–20 hydrocarbon group mentioned hereinabove for $R^{31}$ and $R^{32}$. For $X^2$ and $Y^2$, especially preferred is a methyl group. $X^2$ and $Y^2$ may be the same or different.

$M^2$ indicating a transition metal of Groups 8 to 10 of the Periodic Table has been described hereinabove.

Specific examples of the complex compounds of formula (6) are compounds of the following formulae [1], [2], [3], [4], [5], [6], [7], [8], [9], [10], [11] and [12].

[1]
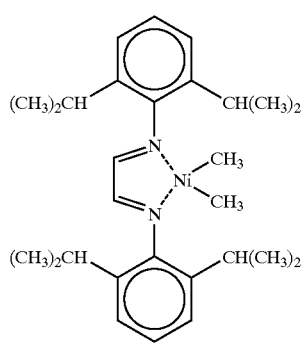

[2]
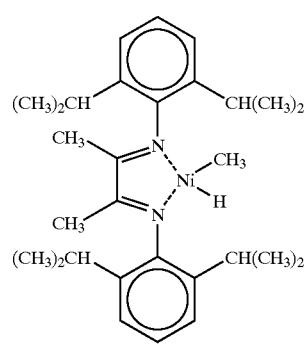

[3]
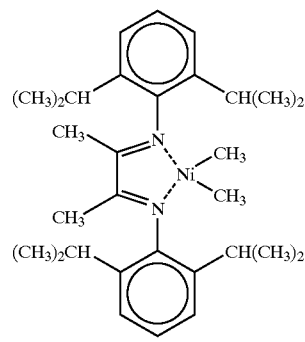

[4]
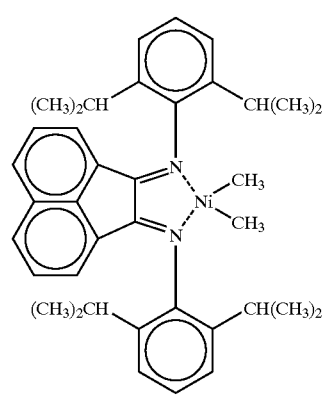

[5]
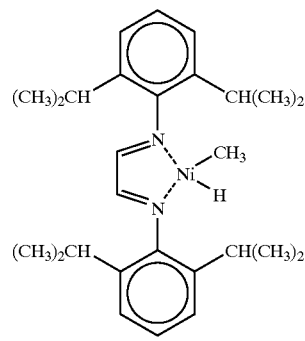

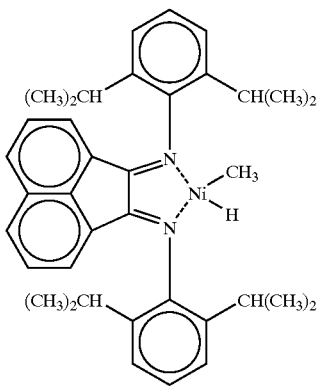

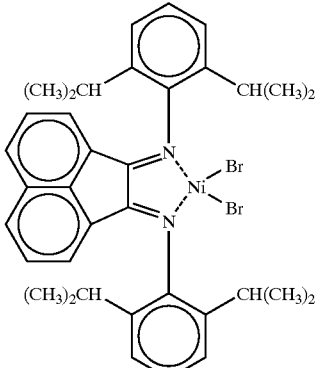

One or more of the complex compounds, optionally as combined, may be used in the invention.

The component (E) is at least one selected from a compound group of (e-1) oxygen-containing organometallic compounds, (e-2) ionic compounds capable of reacting with the transition metal compounds to form ionic complexes, and (e-3) clay, clay minerals and ion-exchanging layered compounds.

The oxygen-containing organometallic compounds (e-1) include compounds of the following general formulae (7) and (8):

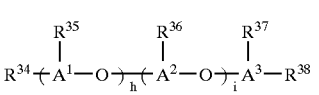

(7)

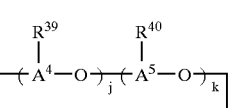

(8)

wherein $R^{34}$ to $R^{40}$ each independently represent an alkyl group having from 1 to 8 carbon atoms; $A^1$ to $A^5$ each independently represents an element of Group 13 of the Periodic Table; h to k each are a number of from 0 to 50, but (h+i) and (j+k) each are at least 1.

In formulae (7) and (8), the alkyl group having from 1 to 8 carbon atoms for $R^{34}$ to $R^{40}$ includes a methyl group, an ethyl group, an n-propyl group, an isopropyl group, all types of butyl groups, all types of pentyl groups, all types of hexyl group, all types of heptyl groups, and all types of octyl groups; and the metal element of Group 13 of the Periodic Table for $A^1$ to $A^5$ includes boron, aluminum, gallium, indium, and thallium. Of those metal elements, especially preferred are boron and aluminum. The values for h to k preferably falls between 1 and 20, more preferably between 1 and 5.

The oxygen-containing compounds of formulae (7) and (8) are alumoxanes such as tetramethyldialmoxane, tetraisobutyldialumoxane, methylalumoxane, ethylalumoxane, butylalumoxane, isobutylalumoxane, etc.; and boroxanes such as trimethylboroxane, methylboroxane, etc. Of these, preferred are alumoxanes, and more preferred are methylalumoxane and isobutylalumoxane.

The alumoxanes may be modified with alcohols. Concretely, the alcohols to be used for modification include methanol, ethanol, propanol, butanol, triphenylmethanol, 2,6-dimethylphenol, 2,4,6-trimethylphenol, 2,6-diisobutylphenol, 2,6-diisobutyl-4-methylphenol, pentafluorophenol, 4-trifluoromethylphenol, 3,5-bis(trifluoromethyl)phenol, 1,4-butanediol, catechol, trimethylsilanol, triphenylsilanol, etc.

The ionic compounds (e-2) capable of reacting with the transition metal compounds to form ionic complexes include coordination complex compounds that comprise an anion with plural groups bonded to a metal, and a cation, and Lewis acids.

Known are various coordination complex compounds that comprise an anion with plural groups bonded to a metal, and a cation. For example, compounds of the following general formula (9) are (10) are preferably used in the invention.

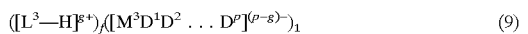

$$([L^3-H]^{g+})_f([M^3D^1D^2 \ldots D^p]^{(p-g)-})_1 \quad (9)$$

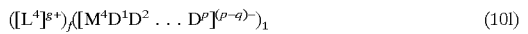

$$([L^4]^{g+})_f([M^4D^1D^2 \ldots D^p]^{(p-q)-})_1 \quad (10l)$$

wherein $L^3$ indicates a Lewis base; $L^4$ indicates $M^5$, $R^{41}R^{42}M^6$ or $R^{43}{}_3C$, which will be mentioned hereinafter; $M^3$ and $M^4$ each represents a metal selected from Group 5 to Group 15 of the Periodic Table; $M^5$ represents a metal selected from Group 1, and Group 8 to Group 12 of the Periodic Table; $M^6$ represents a metal selected from Group 8 to Group 10 of the Periodic Table; $D^1$ to $D^p$ each represent a hydrogen atom, a dialkylamino group, an alkoxy group, an aryloxy group, an alkyl group having from 1 to 20 carbon atoms, an aryl group having from 6 to 20 carbon atoms, an alkylaryl group, an arylalkyl group, a substituted alkyl group, an organometalloid group, or a halogen atom; $R^{41}$ and $R^{42}$ each represent a cyclopentadienyl group, a substituted cyclopentadienyl group, an indenyl group, or a fluorenyl group; $R^{43}$ represents an alkyl group; q indicates the valency of $M^3$ or $M^4$, and represents an integer of from 1 to 7; p represents an integer of from 2 to 8; g indicates the ion valency of $[L^3-H]$ or $[L^4]$, and represents an integer of from 1 to 7; f represents an integer of 1 or more; and $1=[f \times g/(p-q)]$.

Preferred examples of the metal for $M^3$ and $M^4$ in formulae (9) and (10) are boron, aluminum, silicon, phosphorus, arsenic, and antimony; preferred examples of the metal for $M^5$ are silver, copper, sodium, and lithium; and preferred examples of the metal for $M^6$ are iron, cobalt, and nickel.

Concretely, preferred examples of the dialkylamino group for $D^1$ to $D^p$ in formulae (9) and (10) are a dimethylamino group, a diethylamino group, etc.; those of the alkoxy group for them are a methoxy group, an ethoxy group, an n-butoxy group, etc.; and those of the aryloxy group for them are a phenoxy group, a 2,6-dimethylphenoxy group, a naphthyloxy group, etc.

Preferred examples of the alkyl group having from 1 to 20 carbon atoms are a methyl group, an ethyl group, an n-propyl group, an isopropyl group, an n-butyl group, an n-octyl group, a 2-ethylhexyl group, etc.; those of the aryl group having from 6 to 20 carbon atoms, the alkylaryl group and the arylalkyl group are a phenyl group, a p-tolyl group, a benzyl group, a pentafluorophenyl group, a 3,5-di(trifluoromethyl)phenyl group, a 4-tert-butylphenyl group, a 2,6-dimethylphenyl group, a 3,5-dimethylphenyl group, a 2,4-dimethylphenyl group, a 2,3-dimethylphenyl group, etc.

The halogen is preferably fluorine, chlorine, bromine or iodine; and preferred examples of the organometalloid group are a pentamethylantimonyl group, a trimethylsilyl group, a trimethylgermyl group, a diphenylarsenyl group, a dicyclohexylantimonyl group, a diphenylboryl group, etc.

Preferred examples of the substituted cyclopentadienyl group for $R^{41}$ and $R^{42}$ include a methylcyclopentadienyl group, a butylcyclopentadienyl group, a pentamethylcyclopentadienyl group, etc.

In the invention, concretely, preferred examples of the anion with plural groups bonded to a metal are $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B[C_6(CF_3)F_4]_4^-$, $B(C_6H_5)_4^-$, $FB(C_6F_5)_3^-$, $FB(C_{10}F_7)_3^-$, $PF_6^-$, $P(C_6F_5)_6^-$, $Al(C_6F_5)_4^-$, $Al(C_6HF_4)_4^-$, $FAl(C_6F_5)_3^-$, $FAl(C_{10}F_7)_3^-$, etc. Preferred examples of the metal cation are $(C_5H_5)_2Fe^+$, $(CH_3C_5H_4)_2Fe^+$, $[(CH_3)_3CC_5H_4]_2Fe^+$, $[(CH_3)_2C_5H_3]_2Fe^+$, $[(CH_3)_3C_5H_2]_2Fe^+$, $[(CH_3)_4C_5H]_2Fe^+$, $[(C_3)_5C_5]_2Fe^+$, $Ag^+$, $Na^+$, $Li^+$, etc.

The other cations are those of nitrogen-containing compounds such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, N,N-diethylanilinium, etc.; those of carbenium compounds such as triphenylcarbenium, tri(4-methylphenyl)carbenium, tri(4-methoxyphenyl)carbenium, etc.; alkylphosphonium ions such as $CH_3PH_3^+$, $C_2H_5PH_3^+$, $C_3H_7PH_3^+$, $(CH_3)_2PH_2^+$, $(C_3H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, $(C_3H_7)_4P^+$, etc.; arylphosphonium ions such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, $(C_2H_5)_2(CH_6H_5)_2P^+$, etc.

Preferred examples of the compounds of formula (9) are triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetra(pentafluorophenyl)borate, N,N-dimethylanilinium tetrakis(pentafluorophenyl)borate, methyldiphenylammonium tetrakis(pentafluorophenyl)borate, etc.

Preferred examples of the compounds of formula (10) are ferrocenium tetraphenylborate, ferrocenium tetrakis(pentafluorophenyl)borate, dimethylferrocenium tetrakis(pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, silver tetrafluoroborate, etc.

The Lewis acid includes, for example, $B(C_6F_5)_3$, $B(C_6HF_4)_3$, $B(C_6H_2F_3)_3$, $B(C_6H_3F_2)_3$, $B(C_6H_4F)_3$, $BF_3$, $B[C_6(CF_3)F_4]_3$, $B(C_{10}H_7)_3$, $FB(C_6H_5)_2$, $PF_5$, $P(C_6F_5)_5$, $Al(C_6F_5)_3$, $Al(C_6HF_4)_3$, $Al(C_{10}F_7)_3$, etc.

Clay, clay minerals and ion-exchanging layered compounds for the component (e-3) are mentioned below.

<1> Clay and Clay Minerals

For the component (e-3), clay or clay minerals are used. Clay is an aggregate of fine hydrous silicate minerals. It is plastic when kneaded with a suitable amount of water, and is rigid when dried. When calcined at high temperatures, it is sintered. Clay minerals are hydrous silicates which are the essential components constituting clay.

These are not limited to only natural ones, but synthetic products of those substances are employable herein.

<2> Ion-exchanging Layered Compounds

For the component (e-3), also usable are ion-exchanging layered compounds. Ion-exchanging layered compounds are characterized by their crystal structure of such that a plurality of crystal planes. formed through ionic bonding or the like are laminated in parallel layers via weak bonding force between the adjacent layers, in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ionic crystalline compounds having a layered crystal structure, such as $\alpha$-$Zr(HPO_4)_2$, $\gamma$-$Zr(HPO_4)_2$, $\alpha$-$Ti(HPO_4)_2$, $\gamma$-$Ti(HPO,)_2$, etc. These are not clay minerals.

Examples of clay and clay minerals which do not belong to ion-exchanging layered compounds and which are usable for the component (e-3) include clay having a low montmorillonite content and referred to as bentonite; kibushi clay comprising montmorillonite and many other components; gaerome clay; sepiolite and palygorskite having a fibrous morphology; and amorphous or low-crystalline allophane, imogolite, etc.

<3> In the invention, the component (e-3) is contacted with the component (D), the other components (e-1) and (e-2), and an additional component (F), and it is desirable that clay, clay minerals and ion-exchanging layered compounds for the component (e-3) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminum, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces may be changed. Owing to their ion-exchanging ability, the interlayer exchangeable ions in the compounds may be exchanged with any other bulky ions to give layered substances having enlarged interlayer spaces.

<4> The substances for the component (e-3) noted above may be directly used as they are, or, if desired, additional water may be adsorbed onto them, or they may be heated and dehydrated prior to being used.

<5> The component (e-3) may be processed with any of organoaluminium compounds and/or organosilane compounds prior to its use.

<6> For the component (e-3), preferred are clay and clay minerals. Most preferred are phyllosilicic acid compounds, of which smectite is desirable, and montmorillonite is more desirable.

When these oxygen-containing organometallic compounds (e-1), ionic compounds (e-2) capable of reacting with the transition metal compounds to form ionic complexes, and clay, clay minerals and ion-exchanging layered compounds (e-3) are used, only one compound of the component (e-1) maybe used alone, or two or more compounds thereof may be used as combined. The same may apply to the other components. Only one compound of the component (e-2) may be used alone, or two or more compounds thereof may be used as combined. Only one compound of the component (e-3) may be use alone, or two or more compounds thereof may be used as combined. If desired, any of these components (e-1), (e-2) and (e-3) maybe combined in any desired manner.

An alkylating agent (F) may be optionally used in the invention. For this, preferred are organometallic compounds of the following general formulae (11), (12) and (13):

$$R^{44}{}_r Al(OR^{45})_s E_{3-r-s} \quad (11)$$

$$R^{44}{}_2 Mg \quad (12)$$

$$R^{44}{}_2 Zn \quad (13)$$

wherein $R^{44}$ and $R^{45}$ each independently represent an alkyl group having from 1 to 8 carbon atoms; E represents a hydrogen atom or a halogen atom; $0 < r \leq 3$; and $0 \leq s < 3$.

The alkyl group for $R^{44}$ and $R^{45}$ in these formulae (11) to (13) has from 1 to 8, but preferably from 1 to 4 carbon atoms. Its preferred examples are a methyl group, an ethyl group, a propyl group, an isopropyl group, and all types of butyl groups. In these formulae, r is preferably 2 or 3, more preferably 3; and s is preferably 0 or 1.

The organometallic compounds of formulae (11) to (13) include, for example, trialkylaluminiums such as trimethylaluminium, triethylaluminium, tri-n-propylaluminium, triisopropylaluminium, tri-n-butylaluminium, triisobutylaluminium, tri-tert-butylaluminium, etc.; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-tert-butylaluminium chloride, etc.; dialkylaluminium alkoxides such as dimethylaluminium methoxide, diethylaluminium methoxide, diethylaluminium ethoxide, diisobutylaluminium triphenylmethoxide, etc.; dialkylaluminium hydrides such as dimethylaluminium hydride, diisobutylaluminium hydride, etc. They further include dialkylmagnesiums such as dimethylmagnesium, diethylmagnesium, di-n-propylmagnesium, diisopropylmagnesium, dibutylmagnesium, etc.; and dialkylzincs such as dimethylzinc, diethylzinc, ethyl-n-propylzinc, diisopropylzinc, etc. Of these organometallic compounds, preferred are organoaluminium compounds, and more preferred are trialkylaluminiums. In the invention, one or more of the alkylating agents may be used either singly or as combined for the component (F).

Preferably, the olefin polymerization catalyst is prepared from the above-mentioned catalyst components in an inert gas atmosphere of nitrogen gas or the like. The catalyst may be prepared and stored in a catalyst tank, or may be prepared in situ in a polymerization reactor in which the monomers are polymerized in the presence of the thus-prepared catalyst. In the case of the preparation in the reactor, it is desirable that the catalyst is prepared at a temperature not higher than the polymerization temperature of the monomers, aromatic vinyl compound, etc. For example, it may be prepared at a temperature falling between $-30°$ C. and $200°$ C., preferably between 0 and $80°$ C.

Regarding the blend ratio of the components, the molar ratio of the oxygen-containing organometallic compound (e-1) to the transition metal compound of the component (D) preferably falls between 1:0.1 and 1:100000, more preferably between 1:0.5 and 1:10000. The molar ratio of the ionic compound (e-2) that reacts with the transition metal compound to form an ionic complex thereto preferably falls between 1:0.1 and 1:1000, more preferably between 1:1 and 1:100. The amount of the clay, clay mineral or ion-exchanging layered compound (e-3) may fall between 0.1 and 1000 micromoles, preferably between 1 and 200 micromoles, relative to the unit amount (g) of the component (D). The molar ratio of the alkylating agent for the optional component (F) to the transition metal compound (D) may fall between 1:1 and 1:100000, preferably between1:10 and 1:10000.

If further desired, a chain transfer agent (G) maybe used in the invention. It includes, for example, silanes such as silane, phenylsilane, methylsilane, ethylsilane, butylsilane, octylsilane, diphenylsilane, dimethylsilane, diethylsilane, dibutylsilane, dioctylsilane, etc.; and hydrogen. One or more of these chain transfer agents may be used either singly or as combined. When the amount of the chain transfer agent used is suitably controlled, the activity of the catalyst formed will increase.

In the polymerization catalyst for use in the invention, at least one component of the above-mentioned components (D), (e-1), (e-2), (e-3) and (F) may be deposited on a particulate carrier. Thus deposited on such a carrier, the catalyst is in the form of a solid.

As the case may be, the polymerization catalyst may be in the form of a pre-polymerized catalyst that comprises a particulate carrier, the component (E), the component (e-1) (or e-2)), a pre-polymerized polymer or copolymer, and optionally the component (F).

The particulate carrier for the solid catalyst and the pre-polymerized catalyst may be an inorganic or organic compound, and it is fine particulate solid having a particle size of from 10 to 300 $\mu$m, preferably from 20 to 200 $\mu$m. For the inorganic carrier, preferred are porous oxides concretely including $SiO_2$, $Al_2O_3$, $MgO$, $ZrO_2$, $TiO_2$, $B_2O_3$, $CaO$, $ZnO$, $BaO$, $ThO_2$, etc., and their mixtures such as $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, etc. Of those, preferred are carriers that comprises, as the essential component, at least one selected from the group of $SiO_2$ and $Al_2O_3$.

The inorganic oxides may contain minor carbonates, sulfates, nitrates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

The particulate carriers have different properties, depending on their type and preparation method. Preferably, however, their specific surface area falls between 50 and 1000 $m^2/g$, more preferably between 100 and 700 $m^2/g$; and their pore volume falls between 0.3 and 2.5 $cm^3/g$. If desired, the inorganic carriers may be baked or calcined at a temperature falling between $100°$ C. and $1000°$ C., preferably between $150°$ C. and $700°$ C.

The particulate carrier for use herein may also be a granular or particulate organic solid having a particle size of from 10 $\mu$m to 300 $\mu$m. The organic compound includes, for example, (co)polymers of essentially $\alpha$-olefins having from 2 to 14 carbon atoms such as ethylene, propylene, 1-butene, 4-methyl-1-pentene, etc.; and also polymers and copolymers of essentially vinylcyclohexane or styrene.

Using the olefin polymerization catalyst thus prepared in the manner as above, a cyclic olefin, an aromatic vinyl compound and an aliphatic $\alpha$-olefin having from 2 to 20 carbon atoms are polymerized. Preferably, the monomers are polymerized in the presence or absence of a solvent. The solvent includes hydrocarbons such as butane, pentane, hexane, toluene, cyclohexane, etc.; and liquefied $\alpha$-olefins. The polymerization temperature is not specifically defined, but preferably falls between $-50°$ C. and $250°$ C., more preferably between $0°$ C. an $200°$ C. The pressure is not also specifically defined, but preferably falls between atmospheric pressure and 20 MPa, more preferably between atmospheric pressure and 10 MPa.

Not interfering with the effect of the invention, the olefin copolymer of the invention may contain any ordinary additives, promoters and others generally employed in polymers. Preferred additives and promoters for the copolymer are anti-fogging agent, nucleating agent, tackifier, weather-proof stabilizer, heat-resistant stabilizer, light stabilizer, UV absorbent, antistatic agent, electric property improver, anti-aging agent, antioxidant, flame retardant, hydrochloric acid absorbent, neutralizing agent, slip-preventing agent, anti-blocking agent, lubricant, dispersant, plasticizer, flowability improver, softening agent, liquid softener, vulcanization promoter, vulcanization aid, crosslinking agent, stabilizer, pigment, dye, colorant, filler, reinforcing agent, foaming agent, foaming aid, defoaming agent, working promoter, rubber additive, copper injury inhibitor, adhesiveness improver, weld strength improver, thermoplastic resin, etc.

The olefin copolymer of the invention can also be sued as a resin modifier, and it may be formulated into various compositions. Materials preferably combined with the olefin copolymer of the invention are, for example, high-density polyethylene, low-density polyethylene, linear low-density polyethylene, very-low-density polyethylene, isotactic polypropylene, syndiotactic polypropylene, styrene-butadiene rubber, ethylene-olefin rubber, $\alpha$-olefin-aromatic vinyl compound copolymer, cyclic olefin-aromatic vinyl compound copolymer, polystyrene, syndiotactic polystyrene, paraphenylene ether, polyester, etc. Copolymers of the invention that differ from each other in the comonomer composition may be mixed to prepare a composition. To the composition, any of the above-mentioned additives and promoters may be added.

2. Films and Sheets

The copolymer mentioned hereinabove is, either singly or as combined with any of the above-mentioned additives and promoters, or the composition comprising two or more such copolymers are formed into films and sheets of the invention. The method of forming them is not specifically defined. For example, employable is any of tubular molding, compression molding, blow molding, casting, T-die extrusion, calendering, etc. The films and sheets may have a single-layered structure or may have a laminate structure formed by laminating a layer of the copolymer on a substrate or on any other film. The films may be or may not be stretched.

The invention is described in more detail with reference to the following Examples, which, however, are not intended to restrict the scope of the invention. Not overstepping the spirit and the scope thereof, the invention may be modified in any desired manner.

First described are the methods for analyzing and evaluating the copolymer of the invention.

(1) Compositional Analysis of Copolymer

Using JEOL's GSX-400, a copolymer sample is subjected to $^{13}$C-NMR spectrometry, for which is used a mixed solvent of trichlorobenzene/benzene deuteride (3/1). The temperature is 130° C. The styrene content and the norbornene content of ethylene-styrene-norbornene copolymers are obtained according to the equations mentioned below. Briefly, based on the assignment parameters disclosed (in J. Poly. Sci.: Part A, 1998, 36, 1633; and Macromolecules, 1996, 29, 1158), the peaks having appeared in the $^{13}$C-NMR pattern of each sample are integrated.

Styrene content (mol %)=$w/(t-u\times4+v+w/2+x+y)\times100$.

Norbornene content (mol %)=$u\times2/(t-u\times4+v+w/2+x+y)\times100$.

In these, t, u, v, w, x and y each are the integrated values at 24.5 ppm to 30.5 ppm, 32.0 ppm to 33.5 ppm, 33.5 ppm to 35.0 ppm, 36.0 ppm to 38.0 ppm, 40.5 ppm to 42.5 ppm, and 45.0 ppm to 48.5 ppm, respectively. t is assigned to the methylene hydrogen of ethylene and to the methylene carbon on the major side of norbornene; u is to the methylene hydrogen on the minor side of norbornene; v is to the methylene carbon of ethylene, based on the hetero bond of styrene in styrene-ethylene-styrene chain; w is to the methylene hydrogen of styrene; x is to the methine carbon in the side chain moiety of norbornene; and y is to the methine carbon of styrene and to the methine carbon of the main chain moiety of norbornene.

(2) Tensile Modulus

A copolymer sample is press-shaped into a test piece, of which the tensile modulus is measured according to the tensile test of JIS K-7113.

(3) Internal Haze

A copolymer sample is press-shaped into a test piece, of which the internal haze is measured according to the haze test of JIS K-7105.

(4) Elastic Recovery

This is measured in the same manner as in Japanese Patent Laid-Open No. 132590/1993. Briefly, a copolymer sample is press-shaped into a JIS-2 #2 dumbbell test piece, and this is marked to indicate a 25 mm distance on the side having a constant width. The thus-marked distance is referred to as $L_0$. Using a tensile tester, the test piece is pulled so that the chuck-to-chuck distance (originally 80 mm) is prolonged to 160 mm. The stress rate is 50 mm/min. Then, the chuck-to-chuck distance is restored to the original at a stress rate of −50 mm/min. After one minute, the marked distance of the test piece, dumbbell is read. This is $L_1$. The elastic recovery of the test piece is obtained according to the equation mentioned below. The value not larger than 0 means that the samples tested did not recover.

Elastic recovery=$[(2L_0-L_1)/L_0]\times100$ wherein
$L_0$ indicates the original length marked on the dumbbell before the test;
$L_1$ indicates the prolonged length marked on the dumbbell after the test.

(5) Glass Transition Temperature

Using a differential scanning calorimeter (Parkin Elmer's DSC-7), the glass transition temperature of each copolymer sample is measured. Briefly, about 10 mg of the sample to be tested is melted in a nitrogen atmosphere at 190° C. for 3 minutes, then cooled to −45° C. at a cooling rate of 10° C./min and kept at −45° C. for 3 minutes, and thereafter again heated at a heating rate of 10° C./min. The intermediate temperature appearing in the melting profile curve thus obtained is the glass transition temperature of the sample tested.

(6) Limiting Viscosity

Using an automatic viscometer (Rigo's VMR-053Model), the limiting viscosity of each copolymer sample is measured in decalin at 135° C.

PRODUCTION EXAMPLE

The transition metal compound, (tert-butylamido)(2-indenyl)dimethylsilanetitanium dichloride used in Examples 1 to 3 was prepared according to the process mentioned below.

1) Production of 2-bromoindene

Indenebromohydrin (100 g, 0.47 mol) was dissolved in one liter of toluene. With 3.5 ml of concentrated sulfuric acid added thereto, this was refluxed for 1 hour. Then, this was left cooled to room temperature, and washed with water added thereto. The organic layer was separated, and the solvent was evaporated away under reduced pressure. The residue was distilled under reduced pressure, and 8.46 g of an yellow oil of the intended compound was obtained. Its yield is 9.42%. $^1$H-NMR (CDCl$_3$): 3.52 (s, 2H), 6.88 (s, H), 6.97–7.70 (m, 4H)

2) Production of 2-(dimethylchlorosilyl)indene

Magnesium (2 g) was added to tetrahydrofuran (50 ml) in a nitrogen atmosphere. With 1,2-dibromoethane (0.1 ml) added thereto, this was heated with a drier to activate magnesium. The solvent was evaporated away under reduced pressure, and tetrahydrofuran (50 ml) was further added to the residue. To this was dropwise added a tetrahydrofuran solution (300 ml) of 2-bromoindene (5.90 g, 25.63 mmols) over a time of 2 hours. After the addition, this was stirred at room temperature for 2 hours. The reaction mixture was cooled to −78° C., to which was dropwise added a tetrahydrofuran solution (200 ml) of dichlorodimethylsilane (5.0 ml, 41 mmols) over a time of 1 hour. After the addition, this was warmed up to room temperature, and stirred at room temperature for 12 hours, and then the solvent was evaporated away under reduced pressure. The residue was extracted with hexane, and the solvent was evaporated away under reduced pressure. Thus was obtained 5.00 g of an orange oil of the intended compound. Its yield is 93.2%. $^1$H-NMR (CDCl$_3$): 0.62 (s, 6H), 3.56 (2H), 6.9–7.65 (5H)

3) Production of (2-indenyl)-tert-butylaminodimethylsilane 2-(Dimethylchlorosilyl)indene (3.00 g, 14.37 mmols) was dissolved in 100 ml of hexane, and cooled with ice. To this was dropwise added tert-butylamine (7.55 ml, 71.9 mmols) over a time of 10 minutes. After the addition, this was warmed up to room temperature, and stirred for 12 hours. The supernatant was taken out through filtration, and the solvent was evaporated away under reduced pressure to obtain 3.08 g of the intended compound. Its yield is 87.3%. $^1$H-NMR (CDCl$_3$): 0.29 (s, 6H), 1.12 (s, 9H), 3.48 (2H), 7.0–7.6 (m, 5H)

4) Production of (tert-butylamido)(2-indenyl) dimethylsilane-titanium dichloride (2-Indenyl)-tert-butylaminodimethylsilane (3.05 g, 12.4 mmols) was dissolved in 100 ml of ether, and cooled with ice. With n-butyllithium (17.6 ml, 1.64 M, 28.8 mmols) added thereto, this was warmed up to room temperature, and stirred for 12 hours. The resulting lithium salt precipitate was taken out through filtration, washed three times with 50 ml of hexane, and then dried under reduced pressure. The lithium salt thus obtained weighed 1.65 g. This was dissolved in 100 ml of tetrahydrofuran, and cooled to −78° C. To this was added a tetrahydrofuran solution (50 ml) of $TiCl_3(THF)_3$ (2.08 g, 5.61 mmols). This was warmed up to room temperature, and stirred for 12 hours. Next, AgCl (2.5 g, 17.4 mmols) was added to the reaction mixture, and then stirred for 24 hours. The supernatant was taken out through filtration, and the solvent was evaporated away under reduced pressure. The residue was crystallized from toluene/hexane, and washed with hexane to obtain 0.3 g of. the intended compound. $^1$H-NMR (CDCl$_3$): 0.78 (s, 6H), 1.41 (s, 9H), 6.78 (s, 2H), 7.2–7.5 (m, 2H), 7.6–7.8 (m, H)

Example 1

340 ml of toluene, 5.0 ml of styrene, 15 ml of norbornene, and 0.50 ml of a toluene solution of triisobutylaluminium (1.0 mol/liter) were put into a 1.6-liter autoclave equipped with a catalyst supply tube, in that order, and heated up to 50° C. To the autoclave, introduced was ethylene to have a pressure of 0.3 MPa (gauge). Next, a solution of 10.0 μmols of (tert-butylamido)(2-indenyl)dimethylsilane-titanium dichloride and 5.0 mmols of methylalumoxane dissolved in 40 ml of toluene was put into the autoclave through the catalyst supply tube. With ethylene and styrene being copolymerized therein, the inner pressure of the autoclave decreases. Therefore, ethylene was continuously introduced into the autoclave so that it could keep the pressure of 0.3 MPa (gauge), and the copolymerization was continued for 1 hour. Next, methanol was added to this to stop the copolymerization. With a large amount of methanol added thereto, the reaction product was taken out through filtration. The resulting solid was dried under reduced pressure at 60° C. for 4 hours. As a result, 28 g of ethylene-styrene-norbornene copolymer was obtained. Its glass transition temperature was −7° C. and limiting viscosity was 0.81 (dl/g). Measured through $^{13}$C-NMR, its styrene content was 3 mol % and norbornene content was 9 mol %. The internal haze of the shaped piece (test piece) of the copolymer was 4.2%; the tensile modulus thereof was 24 MPa; and the elastic recovery thereof was 81%.

Example 2

295 ml of toluene, 50 ml of styrene, 15 ml of norbornene, and 0.50 ml of a toluene solution of triisobutylaluminium (1.0 mol/liter) were put into a 1.6-liter autoclave equipped with a catalyst supply tube, in that order, and heated up to 50° C. To the autoclave, introduced was ethylene to have a pressure of 0.3 MPa (gauge). Next, a solution of 10.0 μmols of (tert-butylamido)(2-indenyl)dimethylsilane-titanium dichloride and 5.0 mmols of methylalumoxane dissolved in 40 ml of toluene was put into the autoclave through the catalyst supply tube. With ethylene and styrene being copolymerized therein, the inner pressure of the autoclave decreases. Therefore, ethylene was continuously introduced into the autoclave so that it could keep the pressure of 0.3 MPa (gauge), and the copolymerization was continued for 1 hour. Next, methanol was added to this to stop the copolymerization. With a large amount of methanol added thereto, the reaction product was taken out through filtration. The resulting solid was dried under reduced pressure at 60° C. for 4 hours. As a result, 36 g of ethylene-styrene-norbornene copolymer was obtained. Its glass transition temperature was 12° C. and limiting viscosity was 0.57 (dl/g). Measured through $^{13}$C-NMR, its styrene content was 26 mol % and norbornene content was 10 mol %. The internal haze of the shaped piece (test piece) of the copolymer was 9.9%; the tensile modulus thereof was 8 MPa; and the elastic recovery thereof was 93%.

Example 3

255 ml of toluene, 100 ml of styrene, 5.0 ml of norbornene, and 0.50 ml of a toluene solution of triisobutylaluminium (1.0 mol/liter) were put into a 1.6-liter autoclave equipped with a catalyst supply tube, in that order, and heated up to 50° C. To the autoclave, introduced was ethylene to have a pressure of 0.3 MPa (gauge). Next, a solution of 5.0 μmols of (tert-butylamido)(2-indenyl) dimethylsilane-titanium dichloride and 5.0 mmols of methylalumoxane dissolved in 40 ml of toluene was put into the autoclave through the catalyst supply tube. With ethylene and styrene being copolymerized therein, the inner pressure of the autoclave decreases. Therefore, ethylene was continuously introduced into the autoclave so that it could keep the pressure of 0.3 MPa (gauge), and the copolymerization was continued for 1 hour. Next, methanol was added to this to stop the copolymerization. With a large amount of methanol added thereto, the reaction product was taken out through filtration. The resulting solid was dried under reduced pressure at 60° C. for 4 hours. As a result, 34 g of ethylene-styrene-norbornene copolymer was obtained. Its glass transition temperature was 17° C. and limiting viscosity was 0.55 (dl/g). Measured through $^{13}$C-NMR, its styrene content was 43 mol % and norbornene content was 4 mol %. The internal haze of the shaped piece (test piece) of the copolymer was 9.5%; the tensile modulus thereof was 17 MPa; and the elastic recovery thereof was 94%.

Production Example 2

Production of rac-isopropylidenebis(4,5-benzoindenyl)zirconium dichloride

This was produced according to known information in J. Chem. Soc., 1952, 3605–3607; Organometallics, 1994, 13, 964–970; Bull. Soc. Chim., 1967, 987–992; Aust. J. Chem., 1992, 45, 1315; and EP 0872492A2.

Example 4

295 ml of toluene, 50 ml of styrene, 15 ml of norbornene, and 0.50 ml of a toluene solution of triisobutylaluminium (1.0 mol/liter) were put into a 1.6-liter autoclave equipped with a catalyst supply tube, in that order, and heated up to 50° C. To the autoclave, introduced was ethylene to have a pressure of 0.3 MPa (gauge). Next, a solution of 10.0 μmols of rac-isopropylidenebis(4,5-benzoindenyl)zirconium dichloride (this was prepared as above) and 5.0 mmols of methylalumoxane dissolved in 40 ml of toluene was put into the autoclave through the catalyst supply tube. With ethylene and styrene being copolymerized therein, the inner pressure of the autoclave decreases. Therefore, ethylene was continuously introduced into the autoclave so that it could keep the pressure of 0.3 MPa (gauge), and the copolymerization was continued for 1 hour. Next, methanol was added to this to stop the copolymerization. With a large amount of methanol added thereto, the reaction product was taken out through filtration. The resulting solid was dried under reduced pressure at 60° C. for 4 hours. As a result, 7.3 g of ethylene-styrene-norbornene copolymer was obtained. Its glass transition temperature was 9° C. and limiting viscosity was 0.76 (dl/g). Measured through $^{13}$C-NMR, its styrene content was 20 mol % and norbornene content was 10 mol %. The internal haze of the shaped piece (test piece) of the copolymer was 9.2%; the tensile modulus thereof was 9 MPa; and the elastic recovery thereof was 93%.

INDUSTRIAL APPLICABILITY

The olefin copolymer of the invention has a suitable modulus of elasticity and has good elastic recovery and transparency. Therefore, it is favorable for molding materials for films and sheets in the field of wrapping and packaging applications and also in the field of medical therapy and agriculture. The olefin copolymer is a novel olefin resin of which the properties are enough for substitutes for soft polyvinyl chloride.

What is claimed is:

1. An olefin copolymer comprising polymerized units of 0.1 to 4 mol % of a cyclic olefin;

0.1 to 45 mol % of an aromatic vinyl compound; and an aliphatic α-olefin having from 2 to 20 carbon atoms, wherein the cyclic olefin and the aromatic vinyl compound account for from 0.2 to 49 mol % of the olefin copolymer; and wherein the olefin copolymer has a glass transition temperature $T_g$ of lower than 60° C.

2. The olefin copolymer as claimed in claim 1, of which the glass transition temperature Tg is lower than 30° C.

3. The olefin copolymer as claimed in claim 1, of which the tensil modulus is at most 600 MPa.

4. The olefin copolymer as claimed in claim 1, of which the internal haze is at most 20%.

5. The olefin copolymer as claimed in claim 1, which is obtained by polymerizing a cyclic olefin, an aromatic vinyl compound and an aliphatic α-olefin having from 2 to 20 carbon atoms in the presence of an olefin polymerization catalyst that comprises (D) at least one selected from transition metal compounds of groups 4 to 6 of the Periodic Table and transition metal compounds of Groups 8 to 10 of the Periodic Table of the following general formulae (1) to (4), and (E) at least one selected from a compound group of (e-1) oxygen-containing organometallic compounds, (e-2) ionic compounds capable of reacting with the transition metal compounds to form ionic complexes, and (e-3) clay, clay minerals and ion-exchanging layered compounds:

$$Q^1{}_a(C_5H_{5-a-b}R^1{}_b)(C_5H_{5-a-c}R^2{}_c)M^1X^1Y^1 \quad (1)$$

$$Q^2{}_a(C_5H_{5-a-d}R^3{}_d)Z^1M^1X^1Y^1 \quad (2)$$

$$(C_5H_{5-e}R^4{}_e)M^1X^1Y^1W^1 \quad (3)$$

$$L^1L^2M^2X^1Y^1 \quad (4)$$

wherein $Q^1$ represents a bonding group that crosslinks the two conjugated five-membered cyclic ligands ($C_5H_{5-a-b}R^1{}_b$) and ($C_5H^{5-a-c}R^2{}_c$); $Q^2$ represents a bonding group that crosslinks the conjugated five-membered cyclic ligand ($C_5H_{5-a-d}R^3{}_d$) and the group $Z^1$, $R^1$, $R^2$, $R^3$ and $R^4$ each represent a hydrocarbon group, a halogen atom, an alkoxy group, a silicon-containing hydrocarbon group, a phosphorus-containing hydrocarbon group, a nitrogen-containing hydrocarbon group, or a boron-containing hydrocarbon group; and a plurality of these groups, if any, may be the same or different, and may be bonded to each other to form a cyclic structure; a represents 0, 1 or 2; b, c and d each represent an integer of from 0 to 5 when a=0, or an integer of from 0 to 4 when a=1, or an integer of from 0 to 3 when a=2; e is an integer of from 0 to 5; $M^1$ represents a transition metal of Groups 4 to 6 or Groups 8 to 10 of the Periodic Table; $M^2$ represents a transition metal of Groups 8 to 10 of the Periodic Table; $L^1$ and $L^2$ each represent a covalent-bonding or coordination-bonding ligand, and they may be bonded to each other; $X^1$, $Y^1$, $Z^1$ and $W^1$ each represent a covalent-bonding or ionic-bonding ligand, and $X^1$, $Y^1$ and $W^1$ may be bonded to each other.

6. A film or sheet comprising the olefin copolymer of claim 1.

7. A method of making a film or sheet, the method comprising molding, casting, extruding, or calendaring the olefin copolymer of claim 1; and producing the film or sheet.

8. The olefin copolymer as claimed in claim 1, of which the limiting viscosity [η] measured in decalin at 135° C. falls between 0.01 and 20 dl/g.

9. A method of making an olefin copolymer, the method comprising copolymerizing a cyclic olefin, an aromatic vinyl compound and an aliphatic α-olefin having from 2 to 20 carbon atoms; and producing the olefin copolymer of claim 1.

10. A method of using an olefin copolymer, the method comprising molding, casting, extruding, or calendaring the olefin copolymer of claim 1 to produce a film or sheet.

* * * * *